Nov. 20, 1928.  1,692,464

K. E. PEILER

METHOD AND APPARATUS FOR FEEDING GLASS

Filed March 22, 1923   2 Sheets-Sheet 1

Inventor
Karl E. Peiler
By Dorsey Cole
Attorney

Nov. 20, 1928.

K. E. PEILER 1,692,464

METHOD AND APPARATUS FOR FEEDING GLASS

Filed March 22, 1923     2 Sheets-Sheet 2

Inventor
Karl E. Peiler

By Dorsey Cole
Attorney

Patented Nov. 20, 1928.

1,692,464

UNITED STATES PATENT OFFICE.

KARL E. PEILER, OF HARTFORD, CONNECTICUT, ASSIGNOR TO HARTFORD-EMPIRE COMPANY, OF HARTFORD, CONNECTICUT, A CORPORATION OF DELAWARE.

METHOD AND APPARATUS FOR FEEDING GLASS.

Application filed March 22, 1923. Serial No. 626,986.

In the type of glass feeder forming the subject-matter of this application the control of issue of glass from the glass-issuing outlet is due to pneumatic pressure applied to the glass in or below the outlet, to retard, stop, or reverse the movement of the glass. A feeder of this general type is shown and described in my prior application filed March 25, 1922, Serial No. 546,552.

I now propose as additional means of controlling the issuance of glass, to use a throttling element, the construction being such that the issuance of glass may be retarded by such throttling element while the pushing back of the glass in the orifice is not equally retarded. This permits the easy pushing back of the glass in the orifice, which orifice may be so constructed that it constitutes a reconditioning element for the glass which may have been chilled by previous extrusion and severing.

For the purposes above stated my invention consists in the arrangement, construction, and combination of the several parts of which it is composed, as will be hereinafter more full described and claimed.

It also consists in the method hereinafter described for delivering mold charges of glass.

Referring to the accompanying drawings in which corresponding parts are designated by corresponding marks of reference.

Figure 1:
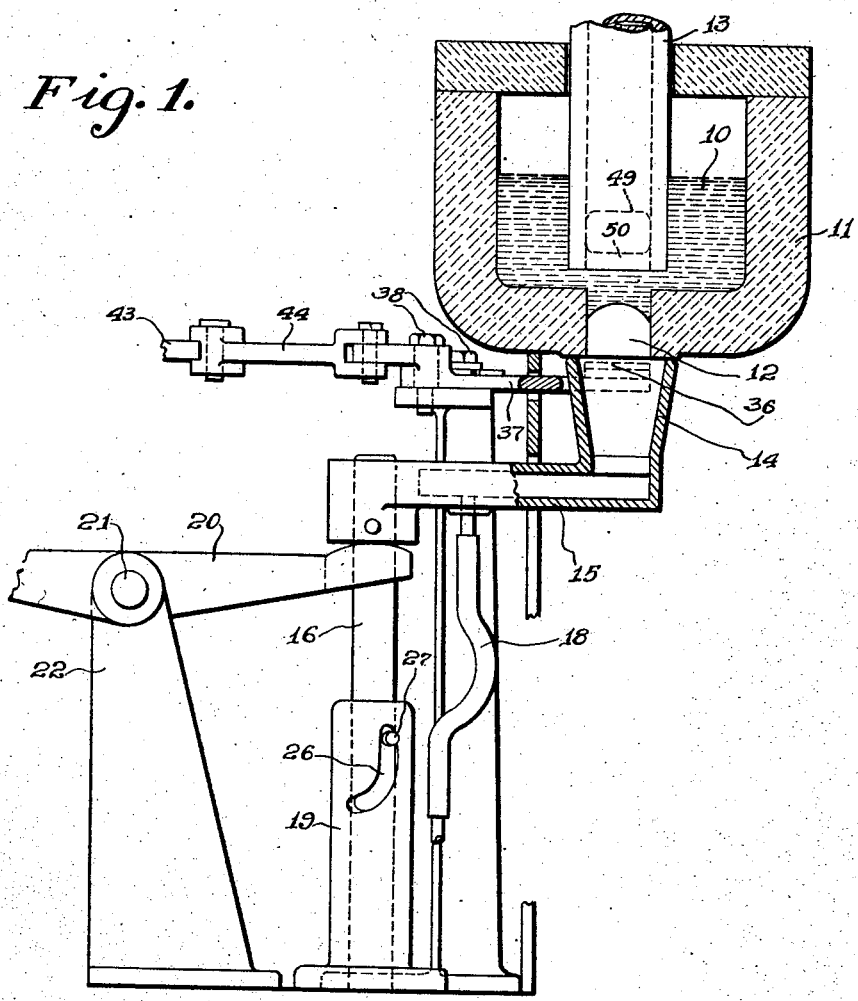
Figure 1 is an end elevation partly in section of one form of a glass feeder containing my invention and adapted to carry out the method herein disclosed.

The molten glass 10 to be fed and separated into mold charges is contained in a suitable container, such for example, as the forehearth 11 projecting from a glass furnace of the usual type. (Not shown).

The bottom of the fore-hearth is provided with an outlet 12, through which the glass is discharged. The outflow of glass to and through the orifice is controlled by a throttling element, specifically shown in the form of a tube 13 projecting downwardly through the glass 10 above and adjacent to the upper end of the outlet 12, the vertical elevation of the lower end of the tube being adjustable by any suitable means to regulate the rate of outflow of the glass to conform to the weight of the charges to be fed.

The discharge of glass from the outlet is further and periodically controlled by an implement shown herein in the form of a pressure cup or bowl 14 carried on the end of an arm 15 fixed on a vertical rod 16. The bottom of the cup is connected through an internal passage in the arm 15 and by a flexible connection 18 with a suitable source of gaseous pressure, for which I prefer to employ air at a fixed and controllable pressure.

The cup is arranged to move vertically towards and from the orifice, and, in order to prevent interference with the dropping of the mold charges, is also swung to one side when lowered. The rod 16 is movably mounted in a standard 19 and the rod and cup are moved vertically by a lever 20 fixed on a rock shaft 21 mounted in suitable bearings 22. The swinging movement of the cup to move it laterally to and from below the orifice may occur during its vertical movement and for this purpose a cam slot 26 formed in the standard 19 guides a pin 27 fixed in the shaft 16. By this construction, as the pin 27 on its downward movement reaches the curved portion of the slot 26, the cup will be swung to one side, out of the way of the falling mold charges, returning through the same path.

The upper edges of the cup when raised may make either tight contact with the bottom walls around the orifice or may be separated therefrom by a space, although such a space is not needed since with my invention it is not necessary to provide for the escape of gases while the cup is up.

The means shown for severing the mold charges comprise shear blades 36, carried on arms 37, pivotally mounted on studs 38 and connected by gear segments 39. The shear blades are actuated through the lever and link 43 and 44 respectively.

The lever 20 may be periodically rocked on the bearings 22, and the shears may be periodically opened and closed by any suitable mechanism, such for instance as that shown in my aforesaid application.

Figure 3:
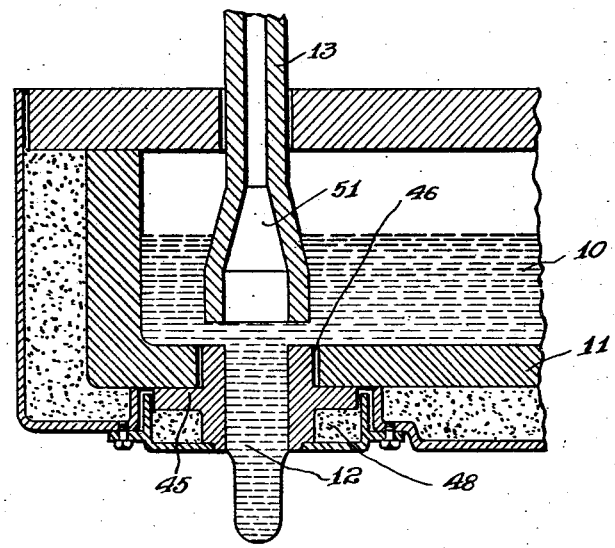
Figure 3 is a view through the forehearth in Figure 1, but at right angles to the line of section of Figure 1, showing a throttling element different in form from that shown in Figure 1, and showing my preferred construction of orifice.
Figure 2:
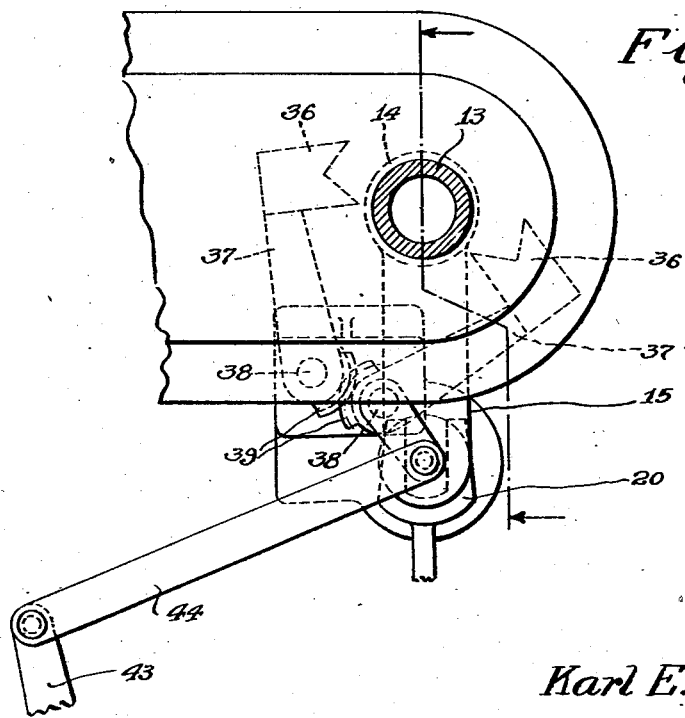
Figure 2 is a plan view thereof.

The orifice 12 is, by preference, as shown in Figure 3 formed as a tube having a flange 45, surrounding an intermediate portion of its exterior, the upper end of the tube passing upwardly through an opening 46 in the bottom of the floor of the forehearth, the upper end of the tube being the lower wall of the flow opening beneath the bottom of the tubular throttler before described.

In the operation of the device as before described, with the cup away from beneath the orifice, the glass issues from the orifice at a rate, dependent among other things, on the vertical setting of the tubular throttler. When a sufficient mass of glass has issued from the orifice, and before it falls away therefrom or breaks into a stream under gravity, the shears close and sever such pendant glass and immediately open. The cup is then raised into position beneath the orifice, and the pressure existing in the cup tends to force back in the orifice the glass left pendant after the severing. This back flow is facilitated because the glass upwardly displaced from the orifice is not obliged to flow back beneath the lower edge of the throttling element, but on the contrary may move upwardly within the hollow cavity of that element with but little resistance. Thus the stub is pushed well back into the orifice as shown in Fig. 1 and the glass is raised in the tube (see dotted line 49). The orifice, due to the fact that the walls of the orifice itself are heated by glass from the furnace flowing therethrough, and due to the fact that the heat imparted to the orifice walls is conserved by insulation 48, (see Fig. 3) is of sufficiently high temperature to prevent the freezing of the glass therein, and to aid in the elimination of the shear marks.

Upon removing the pressure cup, glass again starts to flow through the orifice, it being supplied at first both from the glass contained within the central cavity of the tubular valve element and by glass flowing beneath the lower end of such element from the forehearth. The glass level in the tube is thus reduced to 50. (See Fig. 1). When sufficient glass has extruded, severing again takes place and the operation is repeated.

The internal cavity of the tubular valve may be either of cylindrical form as in Figure 1, or may, as shown in Fig. 3, have its lower end cylindrical and surmounted by a contracted upper portion 51. Thus the resistance to an initial push back of the glass into the orifice is reduced, and additional resistance provided for such push back after a definite movement of the glass in the orifice has been caused. The length of the column of glass pushed back into the tube is also increased as it is constrained into conical form, thus increasing its static head. This tends to stability, and to avoiding the danger heretofore present in feeders of this general type of blowing air or gases from the cup up through the orifice. It also permits the use of higher pressures in the cup, and more prolonged application of pressure than would be permissible in the use of the cylindrical tube of Figure 1.

This construction of the upper portion of the cavity of the tubular throttler has also the effect of increasing the resistance to the downward flow of glass which may have been forced up therein when such glass is at its highest level therein. This is of value in reducing the initial flow from the central cavity at the time the charge commences to form beneath the orifice, a large volume flow at which time, as is well known, is not desirable. On the contrary, as the glass descends in the central cavity, its resistance to flow therein decreases, and its rate of flow therefrom is increased by this factor, compensating, at least to a certain extent, for the decrease of static head in the bore.

In order to increase this resistance effect when the glass is shoved up within the tube, and to provide for variations in it I may, if I so desire, make use of a vertically adjustable member 52 within the tubular throttler, by the setting of which within the tubular cavity of the throttler, the resistance to glass movements in the cavity of such throttler may be varied at will within limitations.

Figure 4:
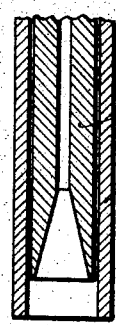
Figures 4 and 5 are detailed fragmental views of throttling elements embodying the principle of this invention, but different from the forms shown in the preceding figures.
Figure 5:
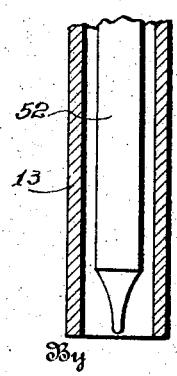

In Figure 4 such internal adjustable member is shown in the form of a tube $52^a$ and in Figure 5 as in the form of a needle 52.

In the structure before described, the throttler, in the operation of delivering a mold charge is a fixed element, although capable of adjustment as described from time to time, to vary the conditions under which successive and different mold charges are delivered.

It is obvious that if desired positive means may be used for heating the outlet instead of, or in addition to, the insulation 48 which conserves the heat as before described.

It has heretofore been proposed to throttle glass discharge orifices by means of adjustable but otherwise fixed plugs. Such form of throttling has not heretofore however been applicable to orifices the discharge of glass through which is to be reversed by fluctuating pressure therebelow. This arises from the fact that the throttling of such an orifice introduces high resistance to the flow of glass past the throttling point. Hence if the glass had been required during the push back to pass through this throttled space the pressure necessary therefor would become excessive and it would have been difficult to obtain and hold such pressure beneath the orifice. The increase of pressure would also cause unstable conditions and the air or gas from which the pressure was obtained would be liable to break through the glass in the orifice and blow out through the glass in the forehearth as bubbles.

The danger of blowing out in push back feeders is recognized and to overcome it, it has heretofore been necessary to use cold glass with resulting high viscosity and to use hot gases for the push back.

By the structures herein disclosed I am able to use the throttler to regulate the flow of glass and to do this without necessitating excessive pressure for push backs. The tendency to blow through the glass in the orifice or in the forehearth is reduced, both by the actual construction of the parts and by the fact that low pressure may be employed. Hence, I am able to keep the glass in the forehearth at proper working temperatures and am not compelled to use hot gases to obtain the push back, although my invention is not limited in any way to the temperatures of the gases employed to effect the push back.

It will be noted that the throttler in effect divides the interior of the forehearth into two sections, the one formed (in the specific embodiment here shown) by the internal cavity of the throttler, and the other the space surrounding the throttler, the two being connected by a restricted passage; that, as the outlet is in the base of the internal cavity of the throttler, the resistance of flow of glass therefrom out through the outlet is less than flow through the outlet from the space around the throttler; and that, as the space within the throttler is only supplied with glass which may have passed the restricted passage, the normal glass level in the throttler will be lower than the glass level external thereto, due to the hydraulic gradient established by the viscosity of the glass and the resistance of the restricted passage. Hence the space within the throttler constitutes an auxiliary supply reservoir, from which glass passes on each issue of glass through the upper end of the orifice to augment the volume of glass from the main reservoir (i. e., the space external to the throttler) and to make up the total amount issued. It will be further noted that the quantity of glass passing through the upper end of the outlet at each complete cycle of the machine is greater than that of the mold charge to be formed; that after the mold charge is severed, some of the excess quantity below the upper end of the outlet is driven back into the forehearth, and that due to the resistance of flow back into the auxiliary and main reservoirs, a portion of the excess (and generally speaking practically the entire excess) goes into the auxiliary reservoir, to await its issuance with the next charge.

I regard it desirable, however, that the auxiliary reservoir shall not have a cross-sectional area much greater than the area of the orifice and that the glass available at any time in the auxiliary reservoir to go into a mold charge be less than the mold charge to be formed. For this reason, and for convenience in construction, and because of operative advantages attendant on using the interior of the tubular throttler as an auxiliary reservoir, I prefer to use substantially the embodiment herein shown, although I do not restrict my broader claim on apparatus thereto. Obviously, the method claims hereinafter made may be carried out with many different forms of structure.

Having thus described the invention, what is claimed:—

1. In a device for forming mold charges of glass, the combination with a container for the glass of stationary but adjustable means for dividing said container into two compartments and for forming a throttling passage of definite size between the compartments, a submerged outlet in one of the compartments, and fluid pressure means applied beneath the outlet for causing a fluctuating movement of the glass in one compartment, and an intermittent flow of glass in the throttling passage.

2. In a device for forming mold charges of glass, the combination with a container for the glass, of stationary but adjustable means for dividing said container into two compartments, and for forming a throttling passage of definite size between the compartments, a submerged outlet in one of the compartments, and fluid pressure means applied beneath the outlet for causing a fluctuating movement of the glass in said outlet and in one compartment, whereby the flow of glass in the throttling passage is retarded during the application of pressure.

3. In a glass feeder, the combination with a glass container having a submerged orifice, of a stationary but adjustable tubular throttling element having its lower open end adjacent to the upper end of the orifice, means for creating a periodically fluctuating gas pressure in excess of atmospheric pressure below the orifice, whereby a fluctuating movement of the glass is produced in the outlet and in the throttling element.

4. In a glass feeder, the combination with a glass container having a submerged orifice, of a tubular throttling element having its lower open end adjacent to the upper end of the orifice, the internal diameter of the element decreasing upwardly, and means for creating a periodically fluctuating gas pressure below the orifice.

5. In a glass feeder, the combination with a glass container having a submerged orifice, of a tubular throttling element having its lower open end adjacent to the upper end of the orifice, adjustable means for varying the effective internal diameter of the throttling element, and means for creating a periodically fluctuating gas pressure below the orifice.

6. In a glass feeder, the combination with a glass container having a submerged orifice, of a tubular throttling element having its lower open end adjacent to the upper end of the orifice, a plug movable within the throttling element to vary the effective diameter thereof, and means for creating a periodically fluctuating gas pressure below the orifice.

7. The method of flowing mold charges of glass which comprises alternately flowing the glass through a throttling passage, issuing the glass through a submerged outlet, severing a mold charge from the issued glass, pushing back the remaining portion of the glass in said outlet without causing a backward flow of glass through said passage, and supplying the excess glass to the next succeeding mold charge.

8. The method of flowing mold charges of glass which comprises flowing the glass from a main source of supply through a throttled passage and through a submerged outlet, periodically severing mold charges from the glass issuing from the outlet, and periodically pushing back from the outlet into a supplementary reservoir, the portions of glass remaining after severance, by fluid pressure applied beneath the outlet.

9. The method of flowing a mold charge of glass which comprises the steps of flowing glass from a main reservoir through a throttled passage in a quantity at least equal to a mold charge, accumulating the glass in an auxiliary reservoir, flowing a quantity of glass greater than the mold charge through a submerged outlet communicating with the reservoir, such last named quantity being formed from glass so passed through the throttled passage and from glass in said auxiliary reservoir, servering a mold charge from the glass so passing the outlet, applying gaseous pressure below the severed glass in the outlet to push back through the outlet a quantity of glass equal to the excess of the amount over a mold charge, and receiving the excess glass in the auxiliary reservoir.

10. The method of forming a mold charge of glass, which comprises issuing glass through a submerged outlet under a head pressure, severing a mold charge from the issued glass, and pushing a portion of the issued glass back in said outlet by a pressure greater than atmospheric pressure against a fluid head pressure less than the head pressure which caused the glass to issue from the outlet.

11. The method of forming a mold charge of glass, which comprises flowing glass through a submerged outlet, severing a mold charge from the issued glass, and pushing a portion of the issued glass back in said outlet against a fluid head pressure which is initially less than the head pressure which caused the glass to issue from the outlet and which increases gradually on upward movement of the glass in said outlet.

In testimony whereof I hereunto affix my signature.

KARL E. PEILER.